US010257021B2

(12) United States Patent
Zheng et al.

(10) Patent No.: US 10,257,021 B2
(45) Date of Patent: Apr. 9, 2019

(54) METHOD AND APPARATUS FOR ROUTER MAINTENANCE

(71) Applicant: Telefonaktiebolaget LM Ericsson (publ), Stockholm (SE)

(72) Inventors: Hongbo Zheng, Beijing (CN); Yanxing Liu, Beijing (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 49 days.

(21) Appl. No.: 15/542,619

(22) PCT Filed: Jan. 12, 2015

(86) PCT No.: PCT/CN2015/070526
§ 371 (c)(1),
(2) Date: Jul. 10, 2017

(87) PCT Pub. No.: WO2016/112484
PCT Pub. Date: Jul. 21, 2016

(65) Prior Publication Data
US 2018/0270104 A1    Sep. 20, 2018

(51) Int. Cl.
*G06F 11/00* (2006.01)
*H04L 12/24* (2006.01)
*H04L 12/26* (2006.01)

(52) U.S. Cl.
CPC ........ *H04L 41/0659* (2013.01); *H04L 41/082* (2013.01); *H04L 43/0876* (2013.01); *H04L 43/16* (2013.01)

(58) Field of Classification Search
CPC ............... G06F 11/142; G06F 11/1423; G06F 11/0709; G06F 11/221; H04L 12/40182; H04L 12/40189
USPC .................................................. 714/4.2, 4.1
See application file for complete search history.

(56) References Cited

U.S. PATENT DOCUMENTS

| 7,336,954 B2 | 2/2008 | Wang et al. | |
| 2011/0069612 A1* | 3/2011 | Yamaguchi | H04L 45/12 370/225 |
| 2011/0164518 A1* | 7/2011 | Daraiseh | H04L 45/121 370/252 |
| 2014/0313903 A1* | 10/2014 | Kikuzuki | H04L 47/122 370/238 |

FOREIGN PATENT DOCUMENTS

| CN | 101383727 A | 3/2009 |
| CN | 102571527 A | 7/2012 |

* cited by examiner

*Primary Examiner* — Sarai E Butler
(74) *Attorney, Agent, or Firm* — Patent Portfolio Builders, PLLC

(57) ABSTRACT

Embodiments of the invention generally relate to router maintenance. An indication that a first router in the communication network is to be maintained is obtained. A parameter associated with a route selection is set to be a predetermined value responsive to the indication. The value of the parameter is sent to a further router in the communication network, such that probability that the further router selects a route passing through the router to be maintained is below a predetermined threshold. In this way, the route selection during the router maintenance is more cost-effective and efficient.

10 Claims, 4 Drawing Sheets

METHOD AND APPARATUS FOR ROUTER MAINTENANCE

TECHNICAL FIELD

Embodiments of the present invention generally relate to the field of communications, and more particularly to a method and apparatus for use in router maintenance in a communication network.

BACKGROUND

In a communication network, a router needs to be maintained periodically. As used herein, the term "router" refers to any suitable device that can route, forward or switch traffic in the communication network based on route selection. Some examples of the router include, but are not limited to, a switch, a gateway, a server and the like. The term "maintenance" refers to any types of maintenance, including, but not limited to, software upgrade, software update, hardware replacement and the like.

Conventionally, while a router is being maintained, the path passing through the router is replaced by a backup path, which may be determined in advance, and thereby bypassed. An example of such a route switch is the technology of fast reroute (FRR). According to the FRR, when the router detects that its next hop router goes down, for example, due to maintenance, the router can switch traffic to a predetermined backup path. The procedure of the FRR inevitably introduces a traffic interruption and therefore causes a traffic loss.

The technology of In-Service Software Upgrade (ISSU) was proposed to avoid the traffic loss during maintenance. According to the ISSU, a router is provided with redundant control and line cards. The redundant control cards include a primary control card and a backup control card, and the redundant line cards include a primary line card and a backup line card. If the control cards need to be upgraded, the backup control card is first upgraded while the primary control card keeps active. Upon the completion of the upgrading of the backup control card, the backup control card is switched to be active, and the primary control card is upgraded. The procedure of upgrading the line cards is similar to the procedure of the control cards as described above. With the ISSU, there is no traffic interruption during the maintenance of the router. However, the ISSU is only applicable to software maintenance. In addition, the redundancy of the cards, in particular, the redundancy of the line cards, is not widely used due to a high cost.

Therefore, there is a need for more efficient and cost-effective solution of router maintenance.

SUMMARY

Generally, embodiments of the present invention provide more efficient and cost-effective solution of router maintenance.

In a first aspect, a method for use in router maintenance in a communication network is provided. The method comprises: obtaining an indication that a first router in the communication network is to be maintained; responsive to the indication, setting a parameter of the first router to be a predetermined value, the parameter being associated with a route selection in the communication network; and sending the value of the parameter to a second router in the communication network, such that probability that the second router selects a route passing through the first router is below a predetermined threshold. The corresponding computer program is also provided.

In a second aspect, an apparatus for use in router maintenance in a communication network is provided. The apparatus comprising: an indication obtaining unit configured to obtain an indication that a first router in the communication network is to be maintained; a parameter setting unit configured to set a parameter of the first router to be a predetermined value responsive to the indication, the parameter being associated with a route selection in the communication network; and a sending unit configured to send the value of the parameter to a second router in the communication network, such that probability that the second router selects a route passing through the first router is below a predetermined threshold.

In a third aspect, an apparatus for use in router maintenance in a communication network is provided. The apparatus comprises a processor and a memory including computer-executable instructions which, when executed by the processor, cause the apparatus to: obtain an indication that a first router in the communication network is to be maintained; responsive to the indication, set a parameter of the first router to be a predetermined value, the parameter being associated with a route selection in the communication network; and send the value of the parameter to a second router in the communication network, such that probability that the second router selects a route passing through the first router is below a predetermined threshold.

In a fourth aspect, an apparatus for use in router maintenance in a communication network is provided. The apparatus comprises processing means adapted to: obtain an indication that a first router in the communication network is to be maintained; responsive to the indication, set a parameter of the first router to be a predetermined value, the parameter being associated with a route selection in the communication network; and send the value of the parameter to a second router in the communication network, such that probability that the second router selects a route passing through the first router is below a predetermined threshold.

According to embodiments of the present invention, if the router is to be maintained, a parameter associated with the route selection may be set to be a predetermined value, and then the value of the parameter is sent to a further router in the network, such that the further router selects a route passing through the first router is below a predetermined threshold. Such a procedure is more cost-effective and efficient.

DETAILED DESCRIPTION

The present invention will now be discussed with reference to several example embodiments. It should be understood that these embodiments are discussed only for the purpose of enabling those skilled persons in the art to better understand and thus implement the present invention, rather than suggesting any limitations on the scope of the present invention.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
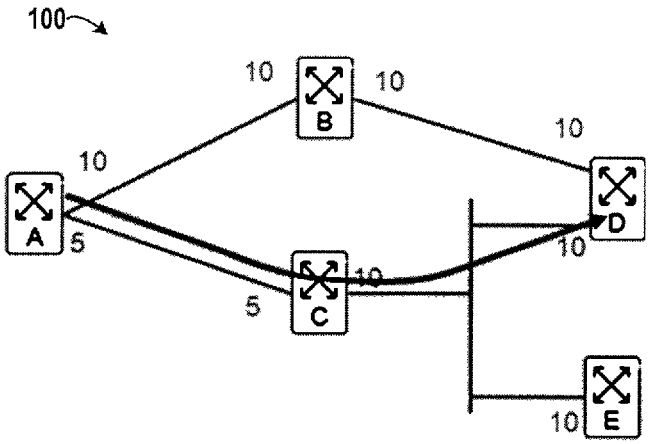
FIG. 1 illustrates an environment of a communication network in which embodiments of the present invention may be implemented in accordance with one embodiment of the present invention.

FIG. 1 shows an environment of a communication network 100 in which embodiments of the present invention may be implemented. As shown, the traffic from routers A to D may be routed through two routes that include a route through routers A, B and D and a route through routers A, C and D. As used herein, the term "route" refers to a path for transporting traffic through a plurality of routers. In this example, there are five routers A-E. This is only for the purpose of illustration without suggesting the limitations on the number of routers. There may be any suitable number of routers.

The communications between the routers may be performed in a wired or wireless way according to any suitable communication protocols either currently known or to be developed in the future. It should be appreciated that the scope of the present invention will not be limited in this regard.

The route selection may be performed based on any suitable route protocols including, but not limited to, Open Shortest Path First (OSPF), Intermediate System-Intermediate System (IS-IS), Border Gateway Protocol (BGP), and/or any other protocols either currently known or to be developed in the future. It should be appreciated that the scope of the present invention will not be limited in this regard.

By way of example, it is assumed that the routers use the protocol of OSPF for the route selection. According to OSPF, link state information is exchanged between the neighboring routers, which includes a metric indicating the cost of a link that may be used for the route selection. Generally, the lower the cost of the link is, the higher the probability that the link is selected. The value of the metric which represents the cost of the link may be set in association with link characteristics. For example, the value of the metric may be set to be inversely proportional to a link bandwidth.

Similar to OSPF, other protocols, such as IS-IS and BGP, may also involve a parameter indicating the cost of a link. For example, IS-IS also involves a metric used to indicate the cost of a link. Regarding the BGP, which is a route protocol between route domains, there is a parameter referred to as Multi-Exit Discriminator (MED) that indicates the path cost to a neighboring route domain. In addition to the MED, the BGP also involves a parameter called Local Preference indicating preference of a route between BGP neighbors in the same routing domain. In such a case, the higher the value of the Local Preference is, the higher the probability that the path is selected.

In the communication network 100 as shown in FIG. 1, a parameter indicating the path cost is used for the route selection, the value of which is indicated by the number of "5" or "10". As shown, there are two numbers for each link, which is set respectively by the two routers at both ends of the link to indicate the path costs in two opposite directions. Specifically, for example, the number of "10" close to the router A is set by the router A to indicate the path cost of the link from the router A to the router B, and the number of "10" close to the router B is set by the router B to indicate the path cost of the link from the router B to the router A. As shown in FIG. 1, with respect to the traffic transported from the router A, the route through the routers A, C and D is selected because of lower path costs.

As discussed above, in the conventional FRR approach, when the router C is maintained, the traffic has to be interrupted for a period of time. Although the technology of ISSU may avoid the traffic interruption, it is very expensive and can only be applicable to software upgrade.

Figure 2:
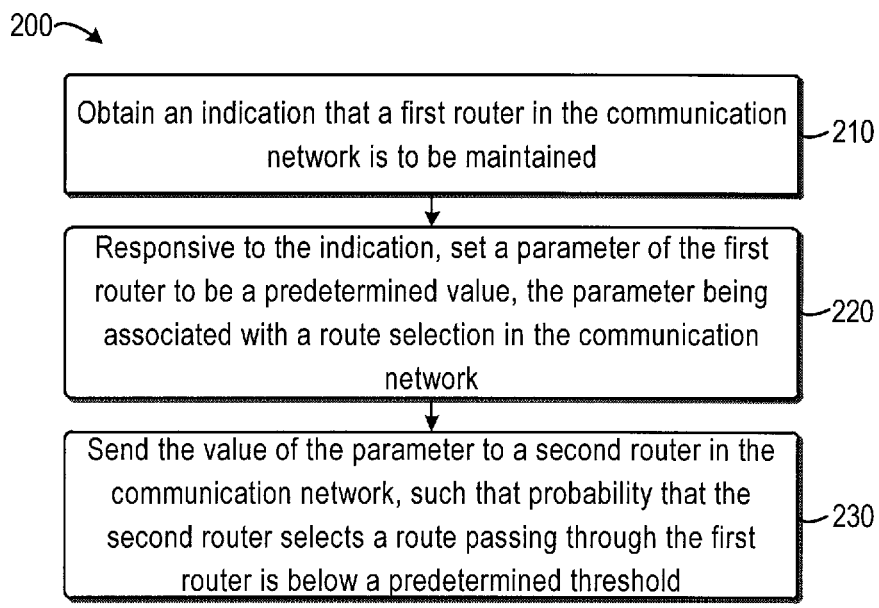
FIG. 2 illustrates a flowchart of a method for use in router maintenance in accordance with one embodiment of the present invention.

FIG. 2 shows a flowchart of a method 200 for use in router maintenance in accordance with one embodiment of the present invention. It would be appreciated that the method 200 may be implemented in the routers A-E of the network 100 as shown in FIG. 1. For the purpose of illustration, the method 200 will be described below in the terms of the router C.

As shown, the method 200 is entered at step 210, where the router C obtains an indication that it is to be maintained. As described above, in the context of the present invention, the maintenance includes, but is not limited to, software upgrade, software update, hardware replacement, and the like.

According to embodiments of the present invention, the maintenance of the router may be performed automatically by the router itself or manually by a user. Accordingly, the indication of the maintenance is automatically generated by the router responsive the automatic maintenance to be performed, or the indication is obtained from the user in the case of the manual maintenance. Specifically, for example, in one embodiment, when the software running on the router is to be upgraded automatically, the indication of the software upgrading is generated responsive to the upgrading to be performed. Alternatively or additionally, in another embodiment, when the user wants to replace the hardware included in the router, he/she instructs an indication of the replacement.

Next, the method 200 proceeds to step 220, where the router C sets a parameter associated with the route selection to be a predetermined value responsive to the indication of the maintenance. Then, the router C sends the value to a further router in the communication network 100 at step 230, such that probability that the further router selects a route passing through the router C is below a predetermined threshold.

According to embodiments of the present invention, the set value of the parameter may be sent to any other routers in the network such that the router to be maintained can be bypassed by the other routers during the route selection. As an example, the value may be directly sent to the neighboring routers. If there are a plurality of routers, the value may be propagated to the routers hop by hop, for example.

As described above, according to embodiments of the present invention, the parameter may be any suitable parameter that can be used for the route selection. For example, the parameter include, but are limited to, the metric used in OSPF or IS-IS and the MED and Local Preference used in BGP.

Specifically, in one embodiment, if the parameter indicating the cost of the route is used, the value of the parameter may be set to be very high. For example, the value may be set to be greater than predetermined threshold cost. As an alternative or additionally example, if the parameter indicating the preference of the route is used, the value of the parameter may be set to be very low. For example, it is set to be below predetermined threshold preference. In this way, other routers in the network will bypass the route passing through the router to be maintained. It should be appreciated that the predetermined threshold cost and the predetermined threshold preference may be any suitable value such that the route passing through the router to be maintained is bypassed during the route selection. The scope of the present invention will not be limited in this regard.

Figure 3:
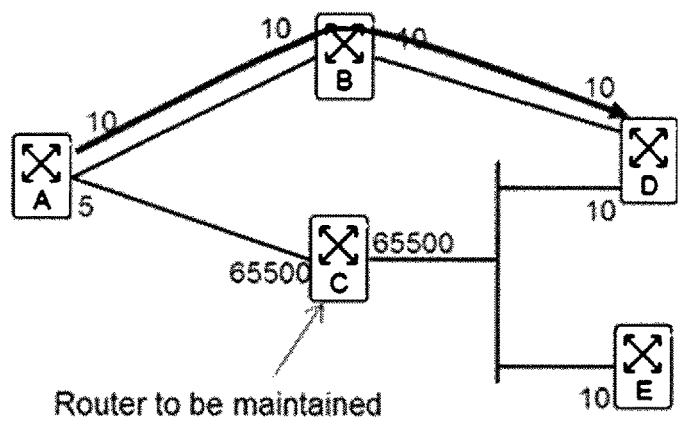
FIG. 3 illustrates an example operation of the router responsive the maintenance to be performed in accordance with one embodiment of the present invention.

A specific example will be discussed below with reference to FIG. 3 which illustrates the operations of the router responsive the maintenance to be performed in accordance with one embodiment of the present invention. As shown, the router C is to be maintained. In this example, the parameter indicating the path cost is used, and it is set to be "65500" responsive to the indication of the maintenance. As described above, the indication may be generated by the router C automatically in the case of the automatic maintenance. Alternatively, the indication may be obtained from the user who manually performs the maintenance of the router. Upon the setting of the parameter, the router C may send the value to its neighboring routers. For example, the router C may propagate the value of the parameter in the network hop by hop such that all of its neighbors may obtain the value. In this way, the path cost of the route passing through the router C is changed to be very high, and accordingly other routers, such as the routers A, B, D and E, will bypass the route passing through the router C and reselect another route with a lower path cost.

Figure 4A:
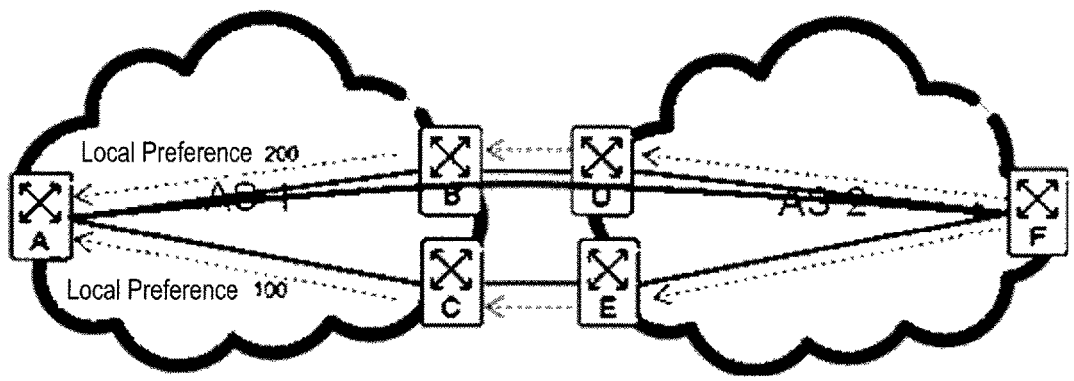
FIGS. 4A and 4B illustrate an example process for use in router maintenance in accordance with one embodiment of the present invention.
Figure 4B:
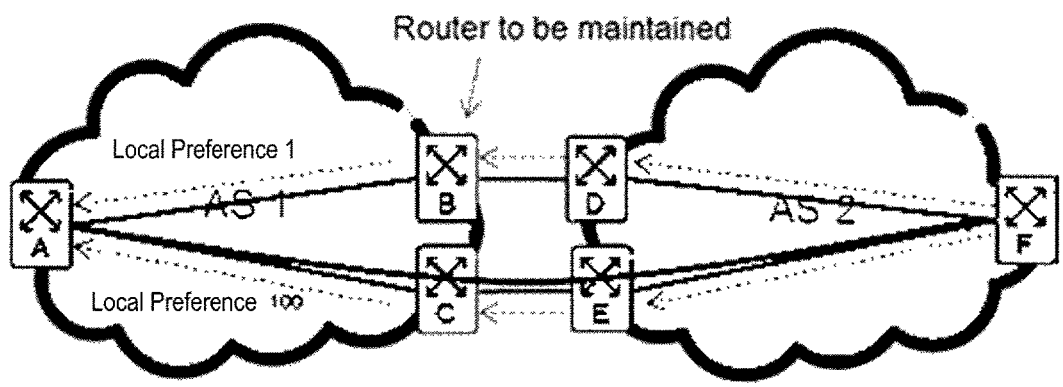

FIGS. 4A and 4B illustrate another example for use in router maintenance according to one embodiment of the present invention. In this example, BGP is used as the route protocol. As described above, in addition to the MED for indicating the path cost of a link between different route domains, BGP also involves the Local Preference indicating the preference of a route between BGP neighbors in the same routing domain. As shown in FIG. 4A, before the router maintenance, the value of the Local Preference of the link between the routers A and B is "200," and the value of the Local Preference of the link between the routers A and C is "100." Thus, the route through the routers A, B, D and F is selected because of its higher Local Preference.

FIG. 4B shows the route change responsive to the router B to be maintained. As shown, the router B changes the value of the Local Preference of the route through itself responsive to its maintenance. In this example, the value is changed to be "1." Then, the router B may notify the changed value to its neighboring router A. Thus, the value of the Local Preference of the link trough the routers A, B, D and F is much lower compared with the link through the routers A, C, E and F. Accordingly, based on the changed value received from the router B, the router A reselects a route passing through the router C instead of the router B.

As described above, in the conventional approaches, the FRR introduces inevitably a traffic loss, and the ISSU is too expensive and only applicable to software upgrade. According to embodiments of the present invention, if the router is to be maintained, it sets the parameter associated with the route selection to be a suitable value, and sends the value to other routers in the network, such that the other routers may bypass the route passing through itself. Such a procedure may reduce the traffic loss and be applied to any types of router maintenance such as hardware replacement, software upgrading and the like. As a result, embodiments of the present invention enable a cost-effective and efficient route selection.

In addition, embodiments of the present invention may also provide benefits to traffic transportation based on the route selection. For example, in a Multi-Protocol Label Switching (MPLS) environment, label packets needs to be distributed in the network. The distributing route may be determined according to the protocol of Label Distribution Protocol (LDP) or Resource Reservation Protocol—Traffic Engineering (RSVP-TE) and based on the routing information determined from the route protocol, such as OSPF, IS-IS, BGP and the like. According to embodiments of the present invention, in the MPLS environment, the label packets may be distributed based on a route that can bypass the router to be updated, and therefore the traffic transportation is more efficient.

Figure 5:
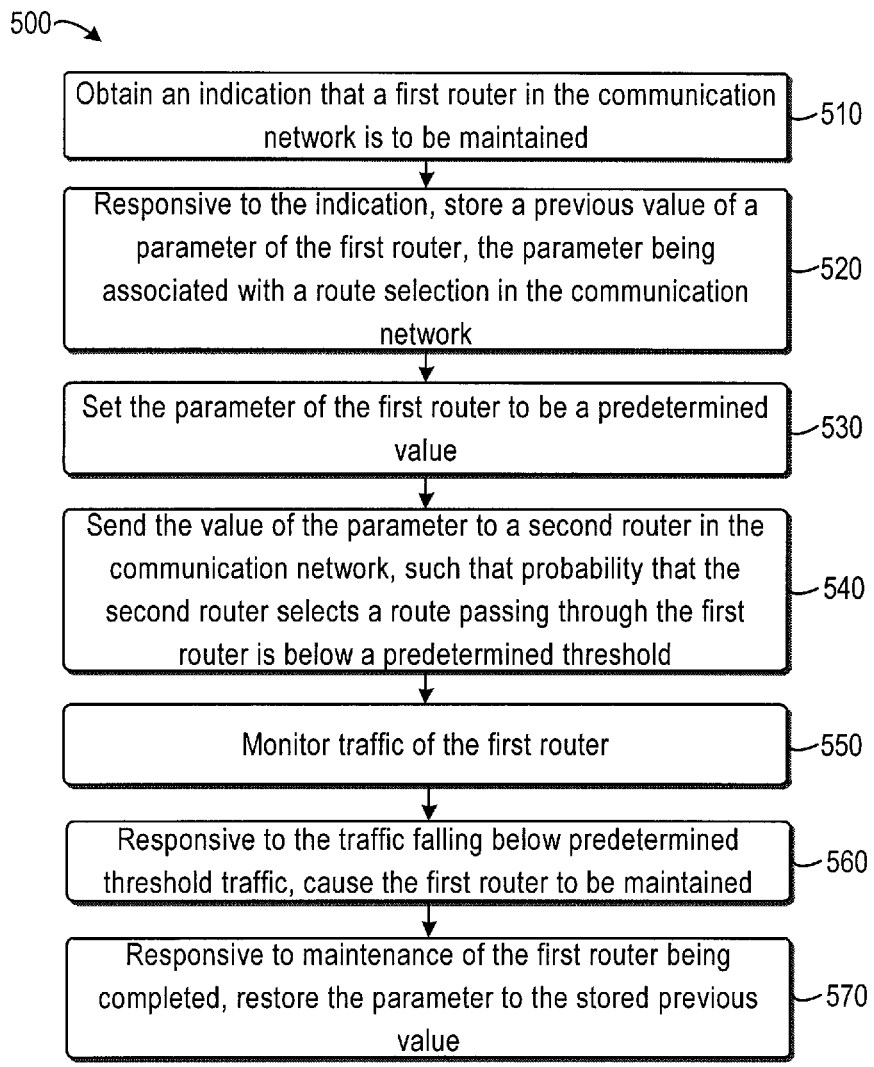
FIG. 5 illustrates a flowchart of a method for use in router maintenance in accordance with one embodiment of the present invention.

FIG. 5 shows a flowchart of a method 500 for use in router maintenance in accordance with one embodiment of the present invention. Similar to the method 200 as shown in FIG. 2, the method 500 may also be implemented in the routers A-E of the network 100 as shown in FIG. 1.

As shown, the method 500 is entered at step 510, where the router obtains an indication that it is to be maintained. This step is similar to step 210 in the method 200, and the details described with reference to FIG. 2 are also applicable and therefore will be omitted.

Then, the method 500 proceeds to step 520, where responsive to the indication of the maintenance, the router stores a previous value of a parameter associated with the route selection such that the previous value can be used again after the maintenance. As described above, the parameter may be any suitable parameter that can be used for the route selection, including, but not limited to, the metric used in OSPF or IS-IS and the MED and Local Preference used in BGP.

According to embodiments of the present invention, the previous value of the parameter may be stored in any suitable storage. For example, in one embodiment, the storage may be local storage within the router. Examples of the local storage include, but are not limited to, a cache, a buffer or any other type of storage devices. As another example, the storage may be storage separately from the router. By way of example, the separate storage may be network storage, such as a network database, located remotely from the router, and the router may access the network storage over the network.

Next, the method 500 proceeds to step 530, where the router sets the parameter to be a predetermined value responsive to the indication of the maintenance. Then, after the value of the parameter is set, the router sends the value to a further router in the communication network 100 at step 540, such that probability that the further router selects a route passing through the router is below a predetermined threshold. The steps 530 and 540 are similar to the steps 220 and 230, and the details described with reference to FIG. 2 are also applicable and therefore will be omitted.

Then, the method 500 proceeds to step 550, where the router to be maintained monitors its traffic. As described above, according to embodiments of the present invention, after other routers in the network receives the newly set value of the parameter, they may bypass the route passing through the router to be maintained. Thus, the traffic through the router may fall down. With the monitoring of the traffic, the maintenance may be performed after the traffic decreases to a stable level which indicates that other routers have bypassed the router and reselected another router.

According to embodiments of the present invention, the monitoring of the traffic may be performed at any suitable timing responsive to the indication of the maintenance. For example, in one embodiment, the router may monitor the traffic immediately after it sends the value of the parameter to other routers in the networks. As another example, the steps of monitoring and sending may be performed at the same time.

After monitoring the traffic at step 550, the method 500 proceeds to step 560, where the router is caused to be maintained responsive to the traffic falling below predetermined threshold traffic. In this way, the router maintenance may be performed after the traffic through the router falls down to a very low level, and therefore the traffic loss may be further reduced. It should be appreciated that the predetermined threshold traffic may correspond to any suitably low traffic level to enable the reduction of the traffic loss. The scope of the present invention will not be limited in this regard.

As described above, after the router monitors that the traffic through itself is low enough, its maintenance can be initiated. Herein, the maintenance may be performed by the router automatically, or by the user manually. Specifically, in one embodiment, if the maintenance involves software upgrading, the router may automatically initiate software upgrading responsive to monitoring the traffic falling below the predetermined threshold traffic.

Alternatively or additionally, in another embodiment, in the case of replacing the hardware of the router by the user, after the router monitors a low level of traffic, it may prompt the user that traffic has fallen down to a low level and the replacement can be performed. Alternatively, the router may only prompt the user to perform the replacement without indicating the traffic level. According to embodiments of the subject matter described herein, the prompt may be implemented in any appropriate form. Examples of the prompt include, but are not limited to, a dialog box, a text, audio or visual message, a vibration, or any suitable combination thereof. Thus, the maintenance of the router may be performed.

Still reference to FIG. 5, in the method 500, after the maintenance of the router is completed, the parameter is restored to the previous value that is stored at step 520. In this way, the maintained router may resume forwarding and routing traffic in the network.

Figure 6:
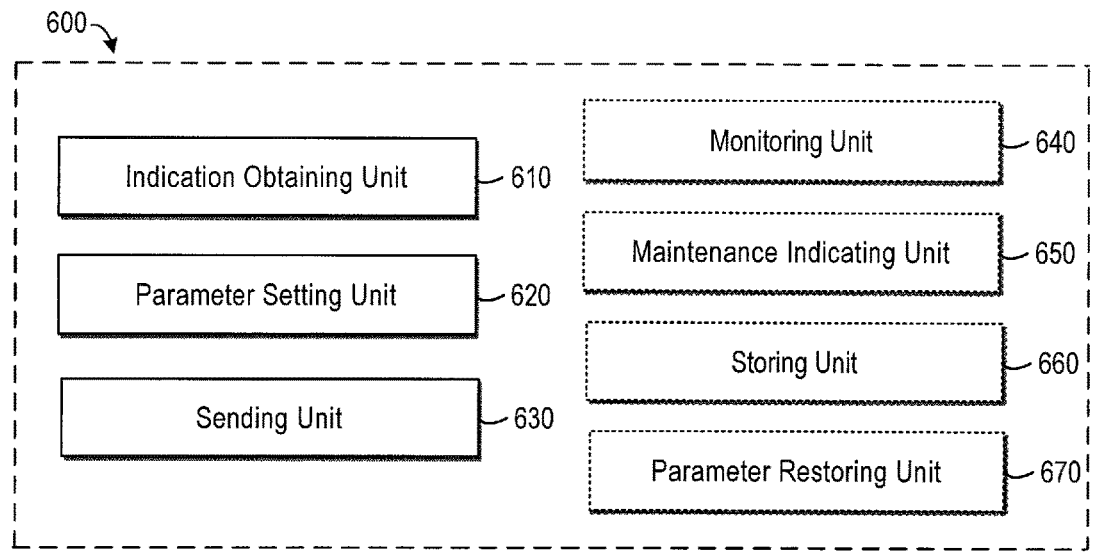
FIG. 6 illustrates a block diagram of an apparatus for use in router maintenance in accordance with one embodiment of the present invention.

FIG. 6 shows a block diagram of an apparatus 600 for use in router maintenance in accordance with one embodiment of the present invention. It would be appreciated that the apparatus 600 may be implemented in the routers A-E of the network 100 as shown in FIG. 1.

As shown, the apparatus 600 comprises an indication obtaining unit 610, a parameter setting unit 620, and a sending unit 630. The indication obtaining unit 610 is configured to obtain an indication that a first router in the communication network is to be maintained. The parameter setting unit 620 is configured to set a parameter of the first router to be a predetermined value responsive to the indication, the parameter being associated with a route selection in the communication network. The sending unit 630 is configured to send the value of the parameter to a second router in the communication network, such that probability that the second router selects a route passing through the first router is below a predetermined threshold.

In one embodiment, the apparatus 600 further comprises a monitoring unit 640 configured to monitor traffic of the first router responsive to the indication; and a maintenance indicating unit 650 configured to cause the first router to be maintained responsive to the traffic falling below predetermined threshold traffic.

In one embodiment, the apparatus 600 further comprises a monitoring unit 640 configured to monitor traffic of the first router responsive to the indication; and a maintenance indicating unit 650 configured to cause the first router to be maintained responsive to the traffic falling below predetermined threshold traffic.

In one embodiment, the parameter indicates cost of a route passing through the first router, and the value of the parameter causes the cost to be greater than predetermined threshold cost.

In one embodiment, the parameter indicates preference of a route passing through the first router, and the value of the parameter causes the preference to be below predetermined threshold preference.

It should be appreciated that modules included in the apparatus 600 corresponds to the steps of the methods 200 and 500. Therefore, all operations and features described above with reference to FIGS. 2 and 5 are likewise applicable to the modules included in the apparatus 600 and have similar effects, and the details will be omitted.

The units included in the apparatus 600 may be implemented in various manners, including software, hardware, firmware, or any combination thereof. In one embodiment, one or more modules may be implemented using software and/or firmware, for example, machine-executable instructions stored on the storage medium. In addition to or instead of machine-executable instructions, parts or all of the modules in the apparatus 600 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 7:
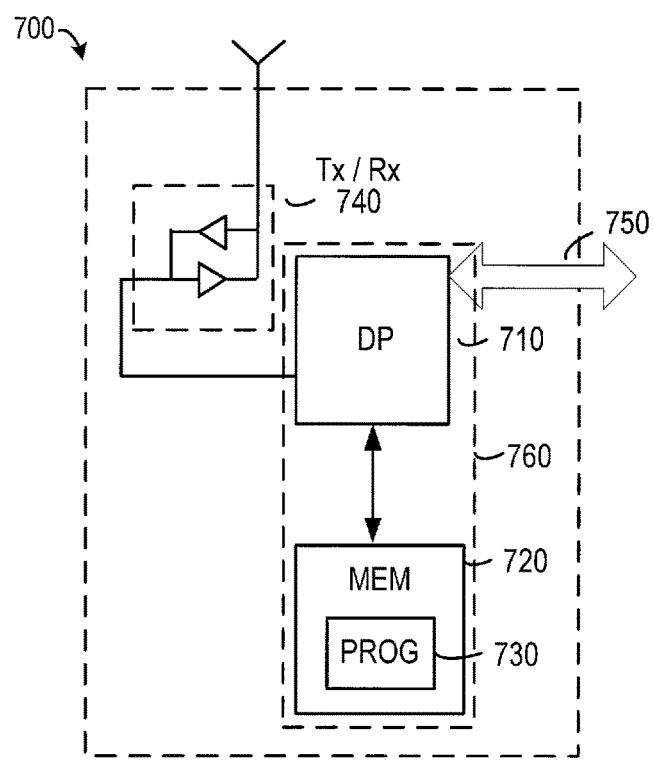
FIG. 7 illustrates a simplified block diagram of an apparatus that is suitable for use in implementing embodiments of the present invention.

FIG. 7 illustrates a simplified block diagram of an apparatus 700 that is suitable for use in implementing embodiments of the present invention. The apparatus 700 may be implemented in the routers A-E of the network 100 as shown in FIG. 1.

As shown in FIG. 7, the apparatus 700 includes a data processor (DP) 710, a memory (MEM) 720 coupled to the DP 710, a suitable RF transmitter TX and receiver RX 740 coupled to the DP 710, and a communication interface 750 coupled to the DP 710. It should be appreciated that the apparatus 700 may also communicate in a wire way. In this case, the TX/RX 740 may be omitted. The MEM 720 stores a program (PROG) 730. The TX/RX 740 is for bidirectional wireless communications. Note that the TX/RX 740 has at least one antenna to facilitate communication. The communication interface 750 may represent any interface that is necessary for communication with other network elements. The apparatus 700 may be coupled via a data path to one or more external networks or systems, such as the internet, for example.

The PROG 730 is assumed to include program instructions that, when executed by the associated DP 710, enable the apparatus 700 to operate in accordance with the embodiments of the present invention, as discussed herein with the method 200 in FIG. 2 and/or the method 500 in FIG. 5.

The embodiments herein may be implemented by computer software executable by the DP 710 of the apparatus 700, or by hardware, or by a combination of software and hardware.

A combination of the data processor 710 and MEM 720 may form processing means 760 adapted to implement various embodiments of the present invention.

The MEM 720 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 700, there may be several physically distinct memory units in the apparatus 700. The DP 710 may be of any type suitable to the local technical environment, and may include one or more of general purpose computers, special purpose computers, microprocessors, digital signal processors (DSPs) and processors based on multicore processor architecture, as non-limiting examples. The apparatus 700 may have multiple processors, such as an application specific integrated circuit chip that is slaved in time to a clock which synchronizes the main processor.

Generally, various embodiments of the present invention may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present invention are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present invention can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present invention may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this invention, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present invention, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present invention has been described in language specific to structural features and/or methodological acts, it is to be understood that the present invention defined in the appended claims is not necessarily limited to the specific features or acts described above. Rather, the specific features and acts described above are disclosed as example forms of implementing the claims.

What is claimed is:

1. A method for use in router maintenance in a communication network, the method comprising:
    obtaining an indication that a first router in the communication network is to be maintained;
    responsive to the indication, setting a parameter of the first router to be a predetermined value, the parameter being associated with a route selection in the communication network; and
    sending the predetermined value of the parameter to a second router in the communication network, such that a probability that the second router selects a route passing through the first router is below a predetermined threshold.

2. The method of claim 1, further comprising:
    responsive to the indication, monitoring traffic of the first router; and
    responsive to the traffic falling below a predetermined threshold traffic, causing the first router to be maintained.

3. The method of claim 1, further comprising:
 storing a previous value of the parameter prior to the setting; and
 responsive to router maintenance of the first router being completed, restoring the value of the parameter to the stored previous value.

4. The method of claim 1, wherein the parameter indicates a cost of the route passing through the first router, and the predetermined value of the parameter causes the cost to be greater than a predetermined threshold cost.

5. The method of claim 1, wherein the parameter indicates a preference of the route passing through the first router, and the predetermined value of the parameter causes the preference to be below a predetermined threshold preference.

6. An apparatus for use in router maintenance in a communication network, the apparatus comprising:
 a processor; and
 a memory including computer-executable instructions and configured so that, when executed by the processor, the computer-executable instructions cause the apparatus to:
  obtain an indication that a first router in the communication network is to be maintained;
  responsive to the indication, set a parameter of the first router to be a predetermined value, the parameter being associated with a route selection in the communication network; and
  send the predetermined value of the parameter to a second router in the communication network, such that a probability that the second router selects a route passing through the first router is below a predetermined threshold.

7. The apparatus of claim 6, wherein the computer-executable instructions are further configured to cause the apparatus to:
 monitor traffic of the first router responsive to the indication; and
 cause the first router to be maintained responsive to the traffic falling below a predetermined threshold traffic.

8. The apparatus of claim 6, wherein the computer-executable instructions are further configured to cause the apparatus to:
 store a previous value of the parameter prior to the setting; and
 restore the value of the parameter to the stored previous value responsive to router maintenance of the first router being completed.

9. The apparatus of claim 6, wherein the parameter indicates cost of the route passing through the first router, and the predetermined value of the parameter causes the cost to be greater than a predetermined threshold cost.

10. The apparatus of claim 6, wherein the parameter indicates preference of the route passing through the first router, and the predetermined value of the parameter causes the preference to be below a predetermined threshold preference.

* * * * *